Figure 1:
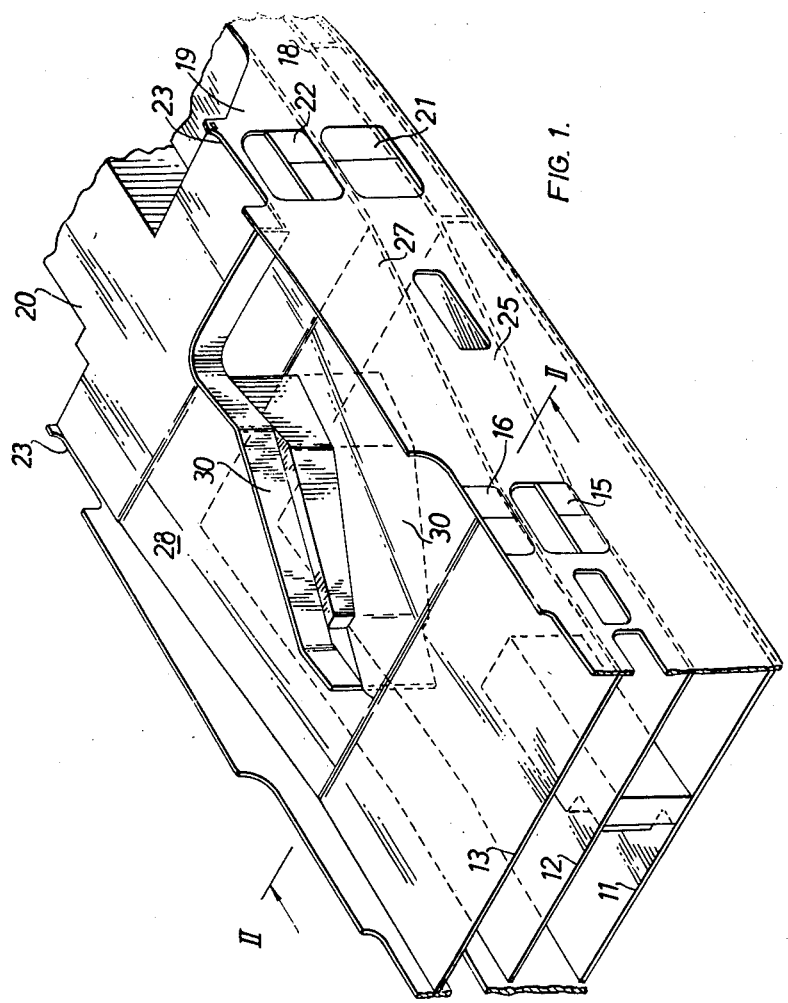

Oct. 23, 1962   R. DOWNHAM ETAL   3,059,606
DECK STRUCTURE FOR SHIPS
Filed Feb. 21, 1961   5 Sheets-Sheet 1

INVENTORS
RALPH DOWNHAM
THOMAS U. TAYLOR BY
Att'ys.

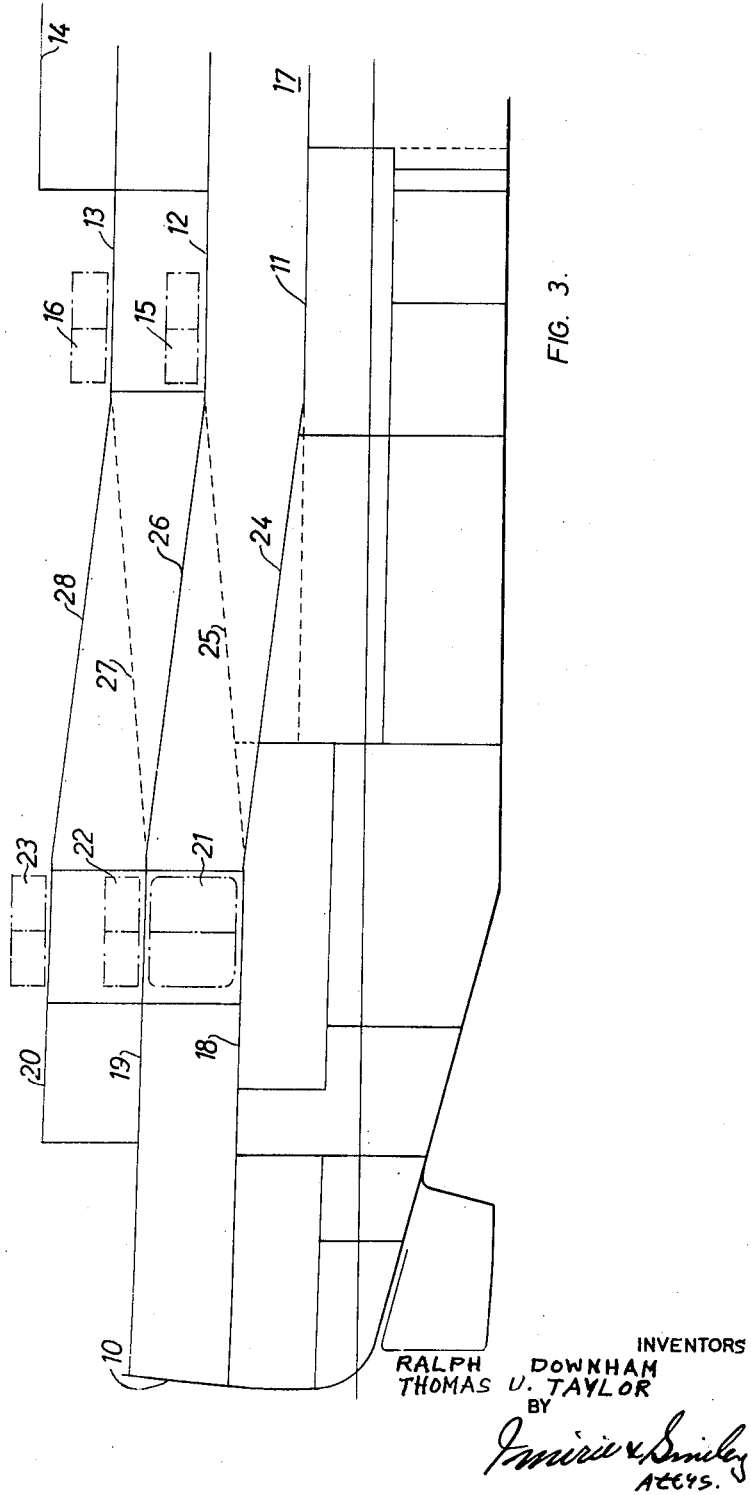

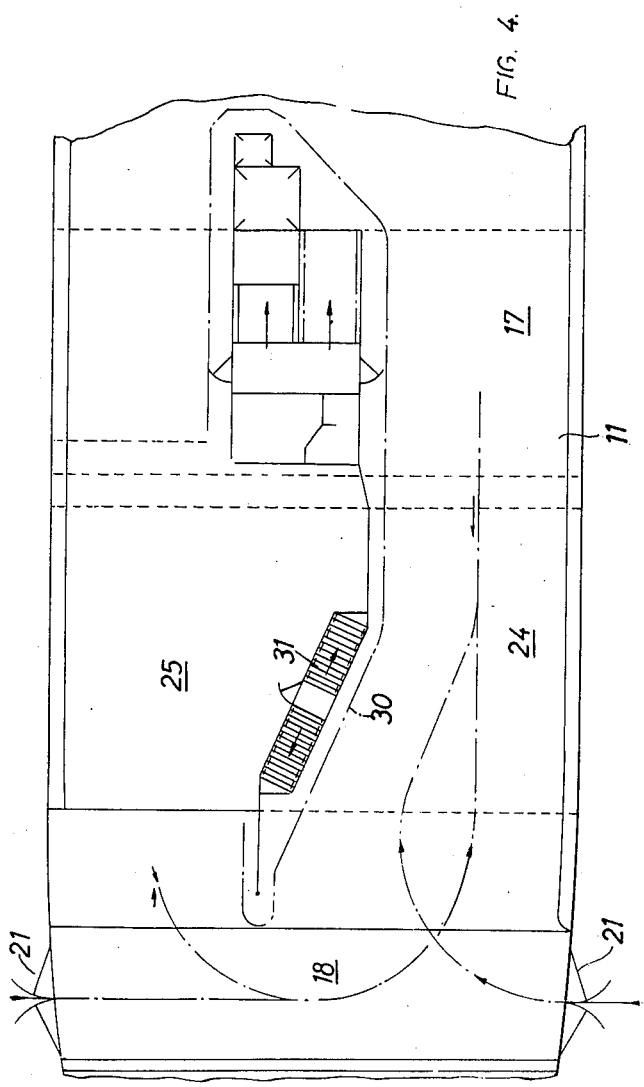

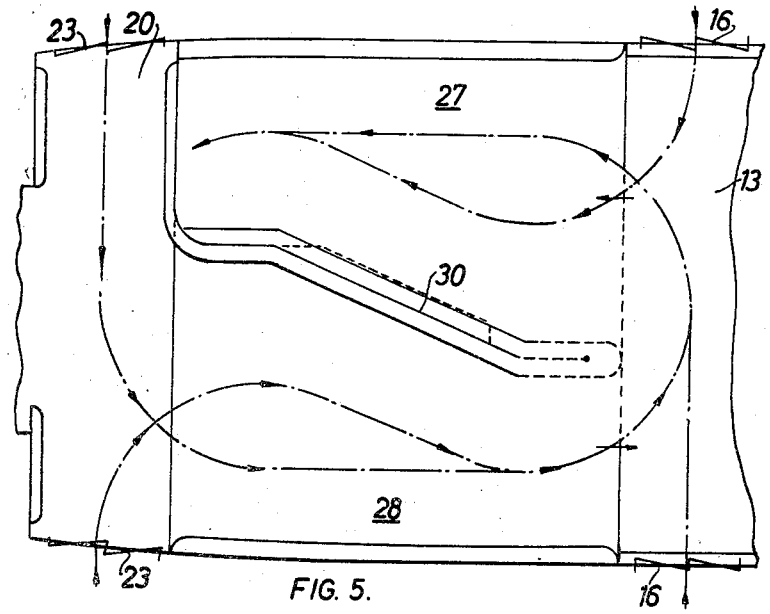
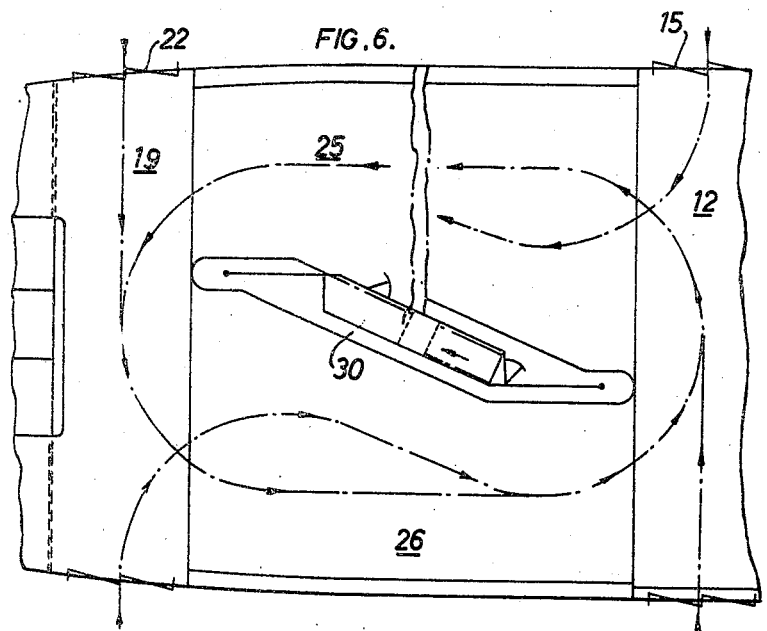

United States Patent Office 3,059,606
Patented Oct. 23, 1962

3,059,606
DECK STRUCTURE FOR SHIPS
Ralph Downham, Wirral, and Thomas U. Taylor, Bebington, England, assignors to Cammell Laird & Company (Shipbuilders & Engineers) Limited, Birkenhead, England, a British company
Filed Feb. 21, 1961, Ser. No. 90,801
Claims priority, application Great Britain May 6, 1960
3 Claims. (Cl. 114—72)

This invention is concerned with improvements in or relating to a deck structure for ships, and more particularly to a vehicle loading and storage structure for ships.

It is an object of the invention to provide a deck structure for ships, particularly for ships being used in car ferry work, to facilitate the loading and unloading of driven vehicles onto or from ships at fixed quays as opposed to floating quays where there is a very substantial difference between tide levels at high and low water.

It is a further object of the invention to provide a deck structure, in a form such as to eliminate or substantially eliminate reversing or tedious manoeuvering of vehicles when moving from one level to another on the ship, particularly during embarkation or disembarkation.

According to the invention, there is provided a vehicle loading deck structure for ships which provides for embarkation at at least two different levels and comprising an arrangement of ramps or ramps and deck and inter-deck platforms or landings whereby a vehicle can move from one or other of said embarkation levels to a vehicle storage or parking deck or space of a ship.

Preferably the ramps are inclined fore and aft in different directions, upwardly and downwardly, on opposite sides of the structure, and open onto the deck and inter-deck platforms or landings so that a vehicle can move in a substantially circuitous path on travelling via the interconnecting ramps from an embarkation level to the storage deck or space and vice versa.

Thus in general there is provided in a ship a vehicle loading structure with a series of platforms extending fully athwartships an dispaced apart longitudinally and vertically to provide two groups the levels of each pair of platforms connected by one ramp being spaced in the vertical direction by a distance less than, and preferably about half, the vertical distance between formal decks.

It is also preferred in order to facilitate the circuitous movement of the vehicles to construct the ramps with at least one tapering side wall so that each ramp is wider at one level than at the other connected level. Conveniently the tapering of the ramp is effected by forming the inner wall or edge of the ramp from a partition set at an angle to the longitudinal axis of the deck structure, i.e. a ramp narrows or widens in the approach from one deck level to another. The partition employed for providing the angled inner edge of a ramp suitably may extend through some or all deck levels.

In one form of vehicle loading deck structure in accordance with the invention, a pair of ramps connecting an interdeck platform with a general deck level, for example, proceeding from a main deck to a shelter deck are located respectively to starboard and to port, and occupy the entire athwartships, i.e. the joint width of the commencement of the ramps at any one level is equal to the beam width of the ship.

In an alternative construction of deck structure, in accordance with the invention, a pair of ramps may be located on either side of the ship, separated by a central space between the pairs of ramps, each pair commencing at any one level and having an "up" ramp and "down" ramp, connecting the respective deck levels and inter-deck platforms, the arrangement being such that the slope of the ramps extending from any one level is the same in the outer ramps of each pair, the alternate slope being used in the inner ramps of each pair, whereby in passing from one level to another, a vehicle will first use an outer ramp and then an inner ramp, thus providing for a wide turning circle within the relatively narrow beam of the ship.

The deck structure in accordance with the invention may comprise a unit on its own, but in general it will be adapted to the general deck structure of the ship. Whereas in a structure forming a unit on its own, the inter-deck levels may be platforms or landings quite separate and distinct from any of the ship's decks, the embarkation levels and inter-deck platforms or landings suitably form part of the general deck structure of the ship, i.e. there are provided a series of general deck levels in one part of the ship which are at a different level from the general deck levels in another part of the ship. Thus, for example, there may be embarkation levels at three decks, main deck, shelter deck and a promenade deck in the forward part of the ship, arranged at a certain series of levels and in the aft part of the ship, there may also be three such decks, main deck, shelter deck and promenade deck which are arranged at intermediate levels in relation to the corresponding forward deck levels, the said aft deck levels providing the remaining embarkation levels or inter-deck platforms for the vehicle loading deck structure in accordance with the invention.

Figure 2:
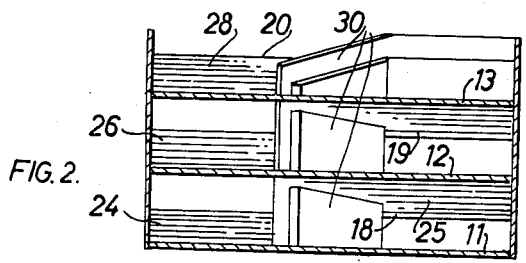
Figure 7:
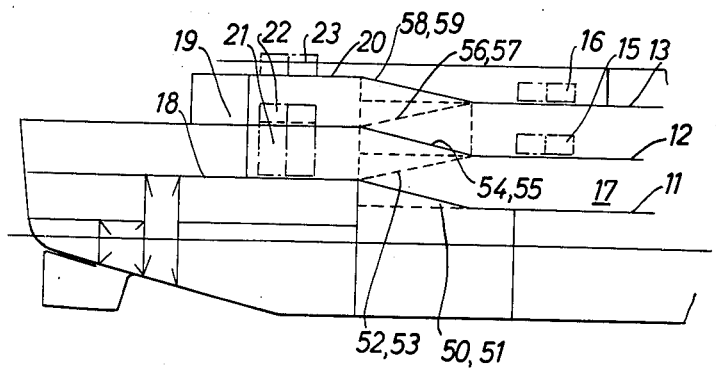
Figure 8:
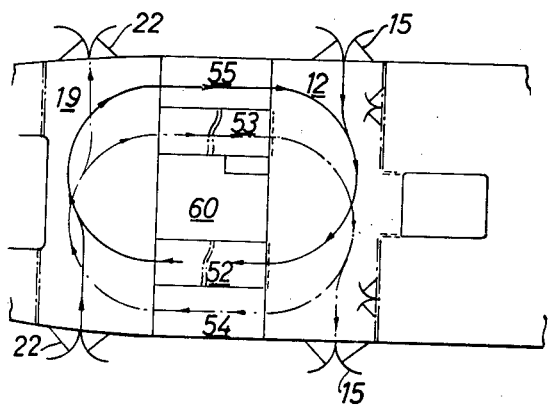

The invention will now be described by way of example with reference to two embodiments of a vehicle loading and storage deck structure in accordance with the invention, and illustrated in the accompanying drawings, wherein FIGURE 1 is a fragmentary perspective semi-diagrammatic view of one embodiment of a deck structure, FIGURE 2 is a section on the line II—II of FIGURE 1 viewed in the direction of the arrows, FIGURE 3 is a semi-diagrammatic side elevation of a ship incorporating a deck structure in accordance with the invention, FIGURE 4 is a semi-diagrammatic plan view of the main deck structure of the ship shown in FIGURE 3, FIGURE 5 is a semi-diagrammatic plan view of the promenade deck structure of the ship shown in FIGURE 3, FIGURE 6 is a semi-diagrammatic plan view of the shelter deck structure of the ship shown in FIGURE 3, FIGURE 7 is a semi-diagrammatic side elevation of a ship incorporating the second embodiment of a deck structure in accordance with the invention, and FIGURE 8 is a diagrammatic plan view at the shelter deck structure of the ship shown in FIGURE 7.

A ship 10 intended for passenger work and for car ferry work is provided in the forward direction with three principal decks, a main deck 11, a shelter deck 12, a promenade deck 13, and a bridge deck 14, the vertical distance between decks 11, 12 and 13 being approximately 9 ft. At each of the shelter and promenade deck levels entrances 15 and 16 in the form of doors or gates are provided on both starboard and port side of the ship. A space 17, is provided on the main deck for the storage of the vehicles. In the rear portion of the ship are the inter-deck platforms 18, 19 and 20, these forming in fact a portion respectively of the aft main deck, the aft shelter deck, and the aft promenade deck. At each of the inter-deck platform levels, entrances in the form of doors or gates are provided in the ships side, these being 21, 22 and 23 at the aft main deck level aft shelter deck level and aft promenade deck level respectively. The spacing between the inter-deck platforms, that is the aft principal decks, is also approximately 9 ft. and accordingly the vertical spacing between each deck and inter-deck platform is approximately 4 ft. 6 inches. The general decks and inter-deck platforms are connected as follows:

On the starboard side, a ramp 24 extends rearwardly and upwardly from the main deck 11 to the aft main deck 18, the ramp being narrower at the lower level and wider at the higher level. From the aft main deck 18 to the main shelter deck 12, on the port side, there is a ramp 25, which again is narrow at the lower level 18 and wider at the higher level 12. A ramp 26 on the starboard side extends rearwardly and upwardly from the shelter deck 12 to the aft shelter deck platform 19. A ramp 27 on the port side extends forwardly and upwardly from the aft shelter deck 19 to the main promenade deck 13. A ramp 28 then extends rearwardly and upwardly from the main promenade deck 13, to the aft promenade deck 20. An angled partition or fence 30 extends between the ramps and this partition or fence 30, is used at the shelter and main deck levels to provide stairways 31 for passengers and crew to gain access from one deck level to another.

The movement of vehicles in embarking and disembarking is shown by the arrowed chain lines in FIGURES 4, 5 and 6. Thus, for example, if a vehicle has to embark from the quayside onto the aft promenade deck 20, it will enter at 23 on either the port or starboard side according to the berthing of the ship. From entrance 23, the vehicle would proceed first to the ramp 28, then by the deck 13 via the ramp 27 to the next lower level, the inter-deck platform 19. If the vehicle embarked at the forward promenade deck level, i.e. at entry 16, it would proceed directly to the ramp 27. Vehicles embarking at aft or forward shelter deck levels, i.e. at entries 22 or 15, or alternatively reaching those levels from the upper deck levels will proceed as follows: vehicles embarking at or reaching 19 proceed via ramp 26 to level 12 and those reaching this level or embarking there proceed via ramp 25 to the aft main deck level 18. From the aft main deck 18, having either embarked via entrance 21 or reached there from a higher level vehicles would proceed immediately to the storage space 17 by means of the ramp 24. Disembarkation from storage takes place in the reverse direction using such ramps and deck and inter-deck platforms as are required according to the state of the tide at the disembarkation quay.

In the second embodiment of the deck structure illustrated in FIGURE 7 and 8, the general deck structure is substantially that as shown in FIGURE 3, but in this second construction, a pair of ramps are provided each to port and starboard respectively with a centre space 60 between each pair of ramps, which space can be utilised for any desired purpose. In the embodiment illustrated there are a pair of ramps arranged at the outer positions, i.e. adjacent the ships sides on both port and starboard, these ramps 50 and 51 proceeding from main deck level 11 to the aft main deck platform 18. From the aft main deck platform 18 to the main shelter deck 12, there are a pair of inner disposed ramps 52 and 53. From the shelter deck 12 to the aft shelter deck 19 the ramps 54 and 55 proceed rearwardly and upwardly. Two inner ramps 56 and 57 proceed upwardly and forwardly from the aft shelter deck 19 to the promenade deck 13. From the promenade deck 13 to the aft promenade deck 20 there are two further ramps 58 and 59 located in the outer positions.

It will be appreciated that this outer and inner arrangement of the up and down ramps provide for the wide turning circle in the movement of vehicles at the various deck and inter-deck platform levels and reduces or eliminates any requirements for tedious reversing and manoeuvering of vehicles during embarkation or disembarkation.

I claim:

1. A vehicle ferry having a plurality of decks arranged in the form of two tiers, said tiers being disposed relatively to one another in the direction of the longitudinal axis of the ferry, the decks of one tier being displaced vertically with respect to the decks of the other tier by a distance corresponding substantially to half the distance between each deck of one tier of decks to provide at least four different deck levels, entrances in both sides of the ferry at each and every deck level, and a ramp connecting a deck of one tier with a deck at the next higher level in the other tier, said ramps running fore and aft of the ferry and terminating at each deck level in the vicinity of the entrances to each of the aforesaid plurality of decks, said decks in the area of said entrances extending the full width of the ferry, each ramp proceeding from one level to another being respectively located on an alternate side of the ship in a spiral-like manner, said ramps being formed in adjoining pairs terminating at each deck level, at least one of the ramps in each pair being situated adjacent a side of the ferry so that the outer side wall of the ramp is formed by the side of the ferry, the ramps of each said pair being inclined oppositely with respect to the deck in which they terminate.

2. A vehicle ferrying vessel having a plurality of decks arranged in the form of two tiers, said tiers being disposed relatively to one another in the direction of the longitudinal axis of the vessel, the decks of one tier being displaced vertically with respect to the decks of the other tier by a substantial amount less than the distance between decks of the other tier to provide at least four different deck levels, entrances in the sides of the vessel at each and every deck level, and a ramp connecting a deck of one tier with a deck at the next higher level in the other tier, said ramps running fore and aft of the vessel and terminating at each deck level in the vicinity of the entrances to each of the aforesaid plurality of decks, each ramp proceeding from one level to another being respectively located on an alternate side of the vessel in a spiral-like manner, the outer side wall of a ramp being formed by the vessel side, the joint width of a pair of ramps terminating at any one deck level occupying substantially the entire athwartships, said pair of ramps being separated by a wall inclined at an angle to the longitudinal axis of the vessel so as to provide ramps tapering in width with the wide portion of each ramp terminating in a deck level adjacent one of said entrances, the ramps of each said pair being inclined oppositely with respect to the deck in which they terminate.

3. A vehicle ferrying vessel having at least six decks arranged in the form of two tiers of three decks each, said tiers being disposed relatively to one another in the direction of the longitudinal axis of the vessel, the decks of one tier being displaced vertically with respect to the decks of the other tier by a distance corresponding substantially to half the distance between each deck of one tier of decks, entrances in the sides of the vessel at each and every deck level, and a ramp connecting a deck of one tier with a deck at the next higher level in the other tier, said ramps running fore and aft of the vessel and terminating at each deck level in the vicinity of the entrances to each of the aforesaid plurality of decks, two pairs of said ramps being provided between a deck in one of said tiers and two vertically spaced adjacent decks of the other of the said tiers, one pair of ramps being located on the port side of the vessel and the other pair on the starboard side of the vessel, a central space being provided between the pairs of ramps, each pair of ramps including one ramp proceeding upwardly from one deck to the next in height and the second ramp proceeding downwardly to the deck next below in height, the ramps in each pair nearest to the side of the vessel having one inclination and the ramps furtherest away from the side of the vessel having the opposite inclination.

References Cited in the file of this patent

UNITED STATES PATENTS

| | | |
|---|---|---|
| 1,298,183 | D'Humy | Mar. 25, 1919 |
| 1,815,687 | Watts | July 21, 1931 |
| 2,482,610 | Burn | Sept. 20, 1949 |
| 2,637,453 | Cleveland | May 5, 1953 |

FOREIGN PATENTS

| | | |
|---|---|---|
| 407,817 | Great Britain | Mar. 29, 1934 |
| 464,640 | Great Britain | Apr. 21, 1937 |

OTHER REFERENCES

"Cargo Handling Data-Sheets," Immer, copyright 1955 by Work Saving International; page A-10 relied on.